(12) United States Patent
Peyravian et al.

(10) Patent No.: US 7,826,476 B2
(45) Date of Patent: *Nov. 2, 2010

(54) APPARATUS AND METHOD TO RESERVE RESOURCES IN COMMUNICATIONS SYSTEM

(75) Inventors: Mohammad Peyravian, Morrisville, NC (US); Mark Anthony Rinaldi, Durham, NC (US); Ravinder Kumar Sabhikhi, Cary, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

This patent is subject to a terminal disclaimer.

(21) Appl. No.: 11/464,892

(22) Filed: Aug. 16, 2006

(65) Prior Publication Data

US 2007/0002888 A1    Jan. 4, 2007

Related U.S. Application Data

(63) Continuation of application No. 10/154,308, filed on May 23, 2002, now Pat. No. 7,126,963.

(51) Int. Cl.
*H04L 12/43* (2006.01)
(52) U.S. Cl. .................. 370/458; 370/443; 370/401
(58) Field of Classification Search ................. None
See application file for complete search history.

(56) References Cited

U.S. PATENT DOCUMENTS

| 5,268,896 | A |  | 12/1993 | Pauwels |  |
|---|---|---|---|---|---|
| 5,388,097 | A |  | 2/1995 | Baugher et al. |  |
| 5,506,847 | A | * | 4/1996 | Shobatake | 370/338 |
| 5,701,465 | A |  | 12/1997 | Baugher et al. |  |
| 5,708,974 | A |  | 1/1998 | Smith |  |
| 5,781,537 | A |  | 7/1998 | Ramaswami et al. |  |
| 5,918,055 | A |  | 6/1999 | Crawford et al. |  |
| 5,982,780 | A | * | 11/1999 | Bohm et al. | 370/450 |
| 5,995,503 | A |  | 11/1999 | Crawley et al. |  |
| 6,058,113 | A |  | 5/2000 | Chang |  |
| 6,094,431 | A |  | 7/2000 | Yamato et al. |  |
| 6,122,272 | A |  | 9/2000 | Tomaszewski |  |
| 6,240,083 | B1 | * | 5/2001 | Wright et al. | 370/348 |
| 6,278,712 | B1 |  | 8/2001 | Takihiro et al. |  |
| 6,310,949 | B1 |  | 10/2001 | Taylor et al. |  |
| 6,320,865 | B1 |  | 11/2001 | Agrawala et al. |  |

(Continued)

FOREIGN PATENT DOCUMENTS

EP    0242764 A2    10/1987

(Continued)

*Primary Examiner*—Duc C Ho
(74) *Attorney, Agent, or Firm*—Stephen A. Calogero; Joscelyn G. Cockburn

(57) ABSTRACT

A Resource Reservation System includes a Token Generation Unit (TGU) which generates and circulates among nodes of a communications system a Slotted Token (SLT) message having sub-fields to carry identification number for each input port in a node and the resource available for each input port. On receiving the message the Resource Control Unit (RCU) in each node can write port identification number, available resource in appropriate sub-fields of the SLT message, and reserve resources in other nodes by adjusting information in the sub-field associated with the other nodes.

15 Claims, 4 Drawing Sheets

U.S. PATENT DOCUMENTS

| | | |
|---|---|---|
| 6,381,228 B1 * | 4/2002 | Prieto et al. ................. 370/323 |
| 6,405,258 B1 | 6/2002 | Erimli et al. |
| 6,453,349 B1 | 9/2002 | Kano et al. |
| 6,763,192 B1 | 7/2004 | Jagannathan |
| 7,453,884 B2 * | 11/2008 | Ma ....................... 370/395.32 |

FOREIGN PATENT DOCUMENTS

| | | |
|---|---|---|
| JP | PUPA61-146039 | 3/1986 |
| JP | PUPA63-191436 | 8/1988 |
| JP | PUPA63-301642 | 8/1988 |
| JP | PUPA04-234243 | 8/1992 |
| JP | PUPA-04-220036 | 11/1992 |
| JP | PUPA10-070566 | 10/1998 |

* cited by examiner

APPARATUS AND METHOD TO RESERVE RESOURCES IN COMMUNICATIONS SYSTEM

The present application is a continuation application of U.S. patent application Ser. No. 10/154,308 filed May 23, 2002 now U.S. Pat. No. 7,126,963, which is assigned to the assignee of the present invention. This application claims the priority date of the earlier filed application as its filing date.

BACKGROUND OF THE INVENTION a) Field of the Invention

The present invention relates to communications systems in general and in particular to resource reservations within said communications systems.

b) Prior Art

A conventional communications system or network is comprised of a plurality of nodes coupled by an interconnect medium. Communication is effected by one node termed "Source Node" sending data to another node termed the "Destination Node". In order to maintain a particular Qualify of Service (QoS) the Destination Node must reserve sufficient resources to process the data without undue delay. In fact, not only must the destination node reserve sufficient resources but any intermediate node that the data must traverse before reaching its destination must also reserve sufficient resources to ensure prompt processing of the data within these intermediate nodes. For example, the nodes must have enough storage space to buffer the data before processing. If adequate buffering is not available the node may have to discard the data. In this example storage is a resource. But, in general, a resource can be anything required to receive and process data. As a consequence a resource may include memory space, processor cycle, link, bandwidth etc.

The prior art provides several flow control proposals for managing data flow within communications networks. Resource management is an integral part of the flow control method. The prior art flow control proposals include Braden et al; Resource Reservation Protocol (RSVP), IETF RFC 2205, September 1997. The RSVP provides for receiver-initiated setup of resource reservation. In other words the destination node reserves resources based on a message sent by a source node. The RSVP protocol can be used by a host to request bandwidth from the network for data flows. The RSVP is usually used by routers to deliver bandwidth requests to all nodes along the patch or paths of a flow. The node issuing the RSVP can also request confirmation assuring that the request has been installed in the network. One of the drawbacks is that the RSVP protocol reserves resources only for simplex flows. Stated another way, RSVP requests resources in only one direction. To this end RSVP treats a sender (source) as logically distinct from a receiver (destination) even though the same application process may act simultaneously as both a sender and receiver.

In another flow control scheme termed "Rate Base" the rate at which data is permitted to be delivered from a source to a destination is controlled via a feedback signal from destination to source. If resources are available at the destination the source may transmit data without restriction. If resources at the destination are in short supply or unavailable the rate of transmission is restricted to the point of cut off altogether. One such rate base technique is described in an ATM document #94-0735 entitled "Enhanced Proportional Rate Control Algorithm" by Larry Roberts, August 1994.

In yet another flow control scheme termed "Credit Base Control", a destination node generates and forwards "credits" to the Source node which may only transfer data if it has credits outstanding. The credits reflect the ability of the destination node to handle data. One such credit base controlled system is described in an ATM Forum document #94-0632 entitled "Credit-Based Proposal for ATM Traffic Management by Hunt et al., July 1994.

Because the above techniques treat the Source Node and Destination Node as separate entity when in fact they may not, a more dynamic system and method for managing data flow including Resource Reservation is required.

SUMMARY OF THE INVENTION

The Resource Reservation System of the present invention includes a Token Generation Unit which generates a special message termed a "Slotted Token (SLT)" which is transmitted to all nodes in the network. The SLT includes a plurality of sub-fields with each sub-field relating to a node in the network. Each sub-field carries an identification (ID) for each input port at the node and a value indicating resources available at the port.

Each node is provided with a Resource Control Unit (RCU) that monitors input ports in the node and communicates via the SLT, to other nodes the available resources for each of the input ports. The RCU also reserves resources in other nodes to which said RCU may wish to send data. The SLT may be circulated in a path dedicated to transmit the SLT or in the interconnecting path which transmits data between the nodes. On its first pass the RCU in each node enters (write) the available resources for the input port in the space reserved in the SLT for that input port. Upon writing the information for all of its input ports, the SLT is forwarded to another node which does the same. The process continues until all nodes in the network make entries in the SLT. On the first or subsequent pass of the SLT each RCU reserves the resource it needs in a particular input port by subtracting the resource from the value recorded in the space associated with the particular port.

DESCRIPTION OF THE PREFERRED EMBODIMENT

To simplify the description common elements are identified by the same name, numeral or other symbols in the figures.

Figure 1:
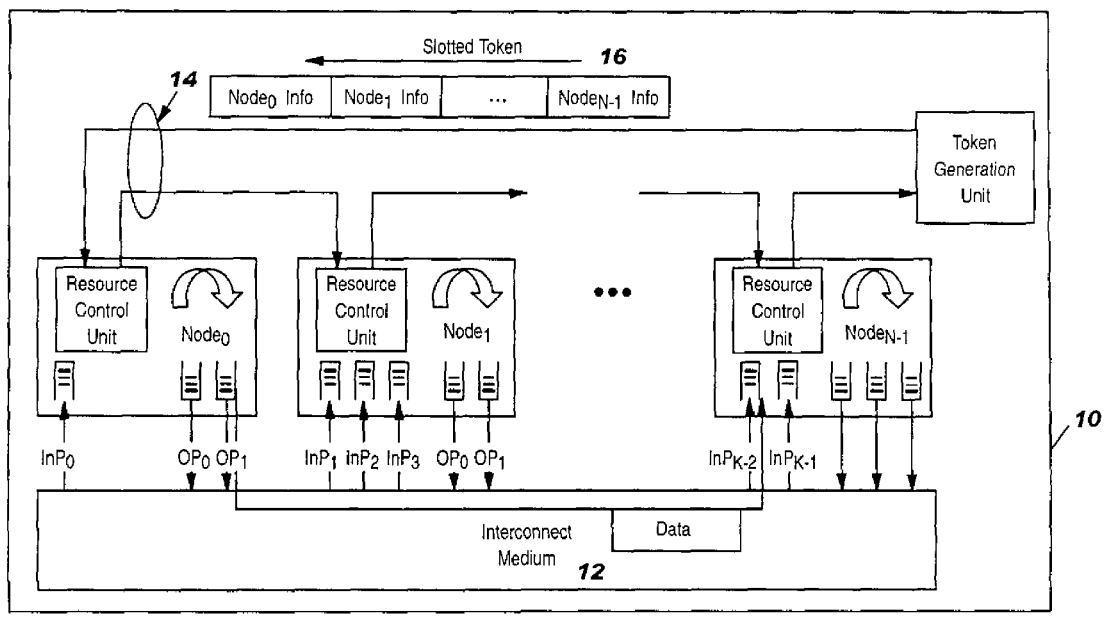
FIG. 1 shows a block diagram of the Decentralized Out-of-Band Resource Reservation system according to the teachings of the present invention.

FIG. 1 shows a block diagram of a Resource Reservation Communications System according to teachings of the present invention. The Resource Reservation Communications System includes a communications subsystem and a resource reservation subsystem. The communications subsystem includes $Node_0$, $Node_1$ ... $Node_{N-1}$. The nodes are coupled together by interconnect medium 12. The communications subsystem may take a plurality of different forms. For example, the communications subsystem can be a box such as a router with each node being a blade in the router. In such an embodiment the interconnecting medium 12 could be a backplane in the router carrying a bus or optical channel for transmitting data between the respective blades. Likewise, the communications subsystem could be a plurality of boxes, each box representing a node, interconnected by an interconnecting medium 12 such as a local are network (LAN) or other types of communications highway such as Internet, etc. Stated another way, the communications subsystem can be any network in which data has to be transferred from one unit to another unit in the network.

Figure 5:
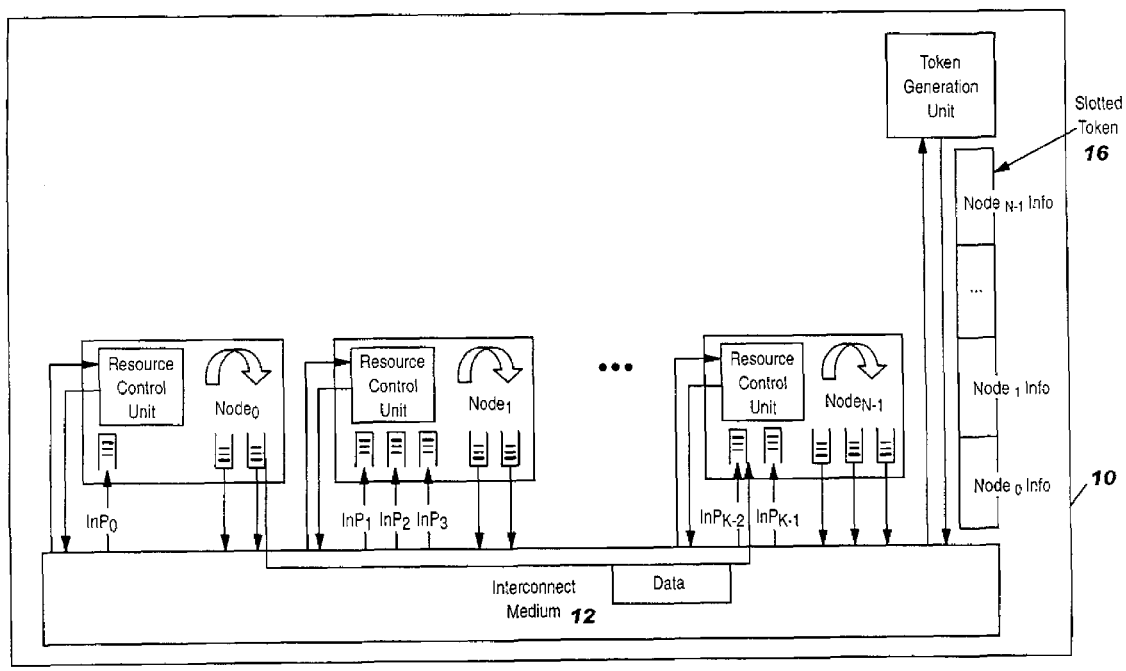
FIG. 5 shows a block diagram of the Decentralized In-band Resource Reservation Unit according to the teachings of the present invention.

Referring to FIGS. 1 and 5, each node in the communications subsystem has one or more input ports and one or more output ports. In particular, $Node_0$ has an input port labelled $InP_0$ and output ports labelled $OP_0$ and $OP_1$. In a similar manner $Node_1$ and $Node_{N-1}$ have appropriate input and output ports labelled as shown in the figures. As a general principle the direction of data flow in the resource reservation communications system 10 is shown by the arrows. Data transmission between nodes such as $Node_0$ and $Node_{N-1}$ is transported along the interconnecting medium 12. Each input port and output port is provided with a buffer shown as a 3-sided symbol in the figures. The horizontal lines in the 3-sided symbol represent a stack or queue of data which is placed in the buffer. Of course other types of symbols can be used to represent the buffering without departing from the spirit or teaching of the present invention.

Still referring to FIGS. 1 and 5, the resource reservation subsystem includes a resource control unit embedded in each of the nodes and a token generation unit interconnected by communications media 14 (FIG. 1) or interconnect medium 12 (FIG. 5). The communications media 14 can be any transmission medium on which a message termed "Slotted Token" (to be discussed hereinafter), generated by the token generation unit, is transmitted. It should be noted that in FIG. 1 the Slotted Token is transmitted on a dedicated transmission path such as communications media 14 whereas in FIG. 5 the Slotted Token is transmitted on the interconnect medium 12 which also transmits the data. The functions which are performed by the Resource Control Unit (RCU) includes monitoring the input ports in the node in which the RCU is embedded and communicates to other nodes the available resources for its input ports. The RCU is also in charge of reserving resources in other nodes to which it needs to send data for processing. The RCU reserves resources in another node by subtracting the desired amount from the value carried in the Slotted Token (SLT) for the particular node. The token generation unit (TGU) generates a special message termed "Slotted Token" which is transmitted in turn to all the resource control units in the system. Even though the token generation unit is shown as a separate unit in FIGS. 1 and 5 the function of the TGU can be integrated with the nodes RCU thereby eliminating the need for a separate TGU. The claims of the present invention intend to cover both embodiments.

Figure 2:
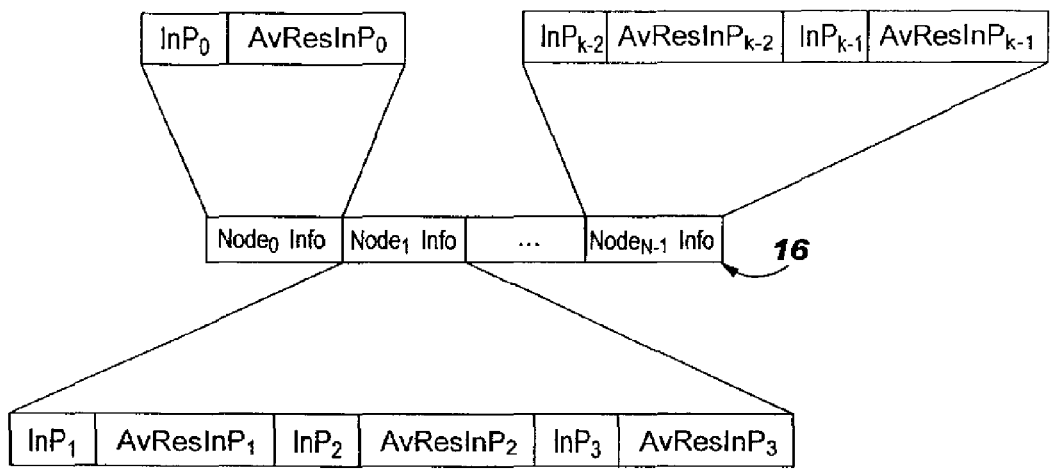
FIG. 2 shows a graphical representation of the Slotted Token (SLT) format according to the teachings of the present invention.

Referring now to FIGS. 1, 2 and 5, the Slotted Token 16 includes a plurality of sub-fields each of which carries information relative to a node in the system. Turning to FIG. 2 for the moment, the first sub-field labelled $Node_0$ Info carries information relative to $Node_0$. Likewise, the sub-field labelled $Node_1$ Info carries information for $Node_1$ and so forth. The information which is in the sub-field includes indicia representing the identification (i.d.) of the input ports associated with that node and the resources available at that input port. With particular reference to FIG. 2 the first sub-field for $Node_0$ has partition labelled $InP_0$ which carries the identification of that port and the partition labelled $AvResInP_0$ carries the resource available at that input port. Likewise, for $Node_1$ there are three input ports labelled $InP_1$ $InP_2$ $InP_3$. With the available resources for each of the input ports recorded in space adjacent to the input port ID. With this Slotted Token message being circulated a resource control unit can enter the port number and associated resource in the space allotted for that port. Likewise, the resource control unit can reserve resources in other ports by adjusting the available resource to indicate the resource that the node wants another node to reserve in order to process data from the requesting node. The partitioning of $Node_{N-1}$ is similar to the other nodes and will not be described further.

Figure 3:
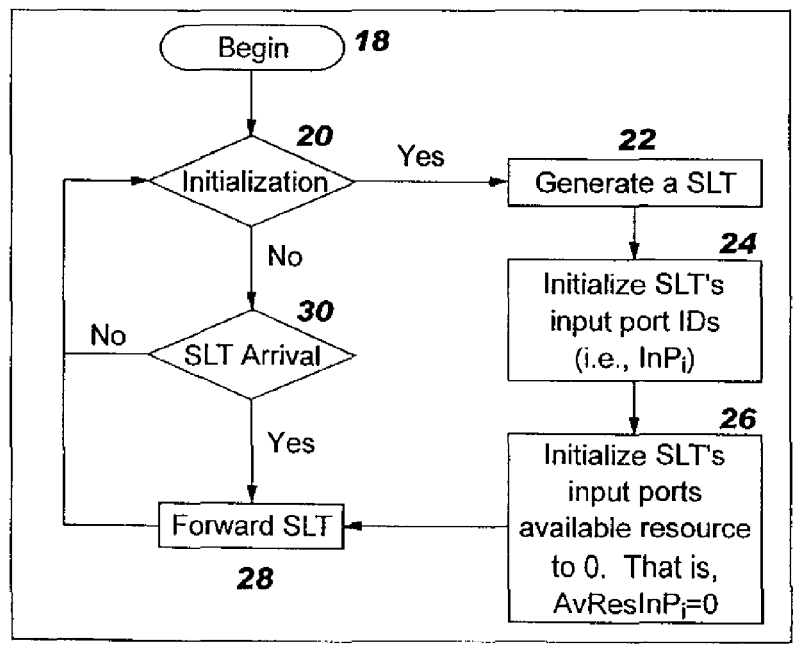
FIG. 3 shows a flowchart for logic in the Token Generation Unit (TGU).

FIG. 3 shows a flowchart illustrating the operation of the token generation unit. Block 18 is the entry point into the flowchart. In block 18 the program enters the process and descends into block 20 whereat a check is made to see if initialization needs to be performed. If initialization is to be performed, the process enters block 22 whereat the Slotted Token (SLT) with the format set forth in FIG. 2 is generated. The process then descends into block 24 whereat the input port's ID in each of the sub-fields is set to an initial value. The program then descends into block 26 whereat the space reserved for writing available resources of an input port is initialized to 0. The process then enters block 28 whereat the SLT is forwarded and the program loops back to block 20. If in block 20 the initialization process was successfully completed the program descends into block 30 whereat it tests for arrival of the SLT. If the SLT has arrived the program then descends into block 28. If the SLT has not arrived the process exits block 30 along the No path into block 20.

In this operation, the Token Generation Unit (TGU) generates the Slotted Token which is in constant circulation as long as the system is up. It is assumed that the ring provides a reliable transport mechanism so that the Slotted Token does not get lost or corrupted. As stated previously, each slot in the Slotted Token is associated with a single input port and indicates the available resources for the input port. Therefore, for $InP_i$ the resource is shown as $AvResInP_i$ in the Slotted Token. Initially when the TGU generates the SLT the TGU sets $AvResInP_i$ to 0 for every $InP_i$. It is further assumed that the amount of available resources for an input port can be represented with a scale value greater than or equal to 0 or any other quantitative expression selected by the designer. When a node's Resource Control Unit receives the Slotted Token the Resource Control Unit updates $AvResInP_i$ for every $InP_i$ that it has. For example, assume, $Node_1$ (FIG. 1) has allocated 150 (units of resource) for $InP_1$, 100 for $InP_2$, and 200 for $InP_3$. When the RCU for node 1 receives the SLT for the first time, it sets $AvResInP_1$ to 150, $AvResInP_2$ to 100 and $AvResInP_3$ to 200.

When a node's RCU receives the SLT it also uses that to reserve resources in other nodes to which it needs to send data for processing. For example, assume $Node_0$ (FIG. 1) needs to send data, now or in the future, to $InP_{k-2}$ or $Node_{N-1}$. So, when the RCU for $Node_0$ receives the SLT it reserves resources in $InP_{k-2}$ by deducting from $AvResInP_2$ the amount that it needs. For example, if the RCU for $Node_0$ wants to reserve 10 units in $InP_{k-2}$ it deducts 10 from $AvResInP_{k-2}$ before forwarding the SLT. It should be noted that the amount of resource reservation is limited to what is indicated as being available in the Slotted Token message.

Figure 4:
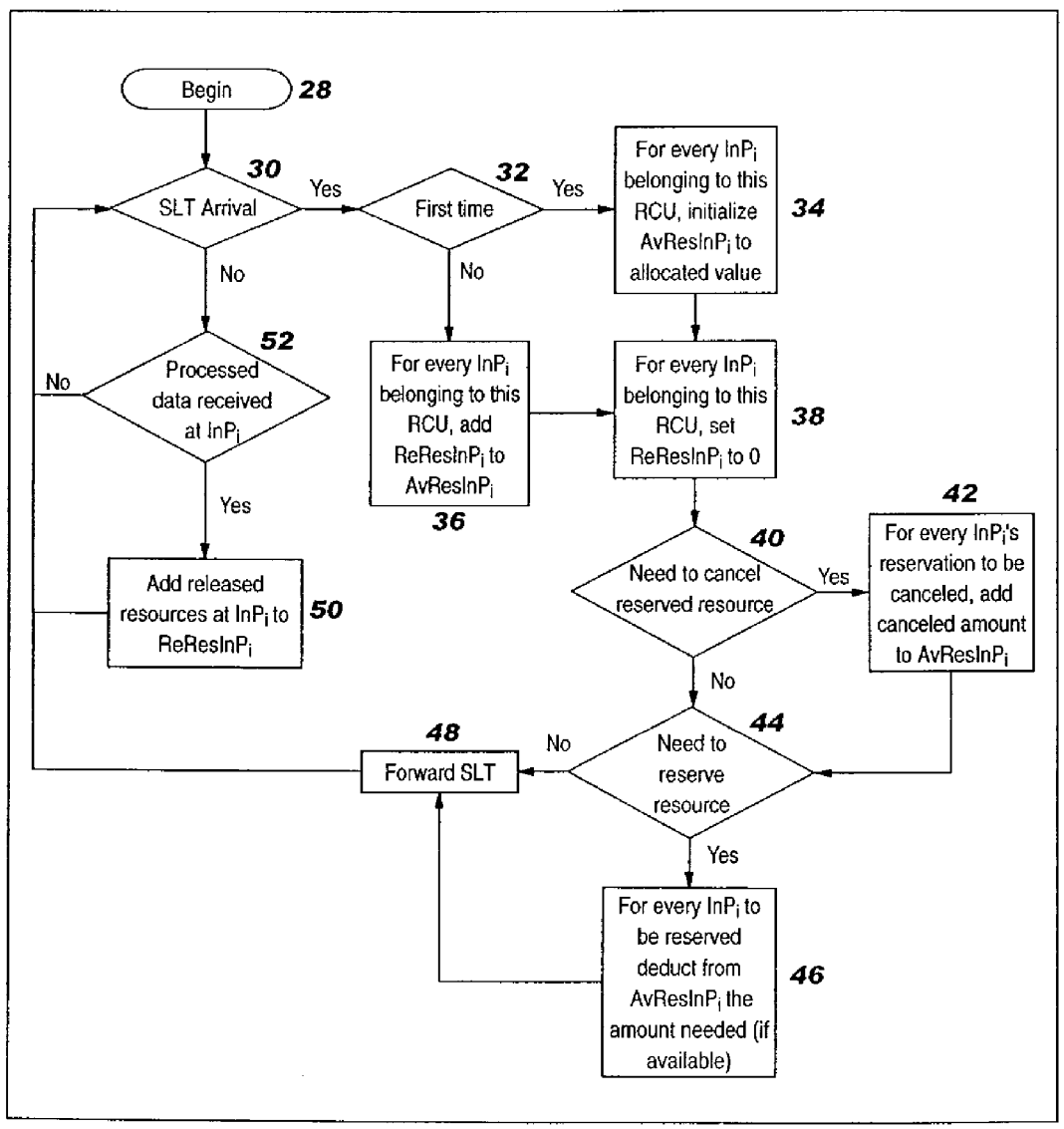
FIG. 4 is a flowchart for logic in the Resource Control Unit (RCU).

FIG. 4 shows a flowchart for the operation of the Resource Control Unit. The Resource Control Unit could be implemented as a state machine, a program processor combinatorial logic or similar devices. The flowchart in FIG. 4 can be used to generate the Resource Control Unit as set forth in the specification.

FIG. 4 shows a flowchart illustrating the operation of the resource control unit (RCU). The flowchart can be used by one skilled in the art to design the Resource Control Unit. In block 28 the program enters the process and descends into block 30 whereat a check is made to see if the Slotted Token (SLT) has arrived. If the SLT has not arrived the process exits along the No path into block 52 whereat the process check to see if any data received at the input port (InP) has been processed. If the answer is No the process loops back into block 30. If the response is Yes the program enters block 50 whereat the resource released as a result of processing frames received at the port is added to the resource available for that particular port. The process then loops from block 50 to block 30.

Still referring to FIG. 4, if at block 30 the answer is Yes the program enters block 32 where it checked to see if SLT has arrived for the first time. If the response from block 32 is No the process descends into block 36. In block 36 the total amount of released resource (ReResInP$_i$) associated with the input port InP$_i$ since the last time the SLT was received is added to the amount of available resource for the input port InP$_i$.

From block 36 the program enters block 38. In block 38 the total amount of released resource (ReResInP$_i$) associated with the input port InP$_i$ since the last time the SLT was received is reset to 0.

With respect to block 32 if the SLT is being received for the first time in the RCU the program enters block 34 whereat the RCU inserts the value for the resources available at each of its input ports and descends into block 38.

Still referring to FIG. 4, from block 38 the program descends into block 40 whereat the RCU checks to see if a reserve resource needs to be cancelled. If the response is Yes the program exits block 40 along the Yes path into block 42 whereat for every port's reservation to be cancelled the amount is added to the resources available for that particular port. From block 42 the program descends into block 44. With respect to block 40 if the RCU does not desire to cancel a reserved resource the program descends into block 44. In block 44 the RCU decides if it needs to reserve a resource. If the answer is Yes the program descends into block 46 whereat the Resource Control Unit deducts from every input port the amount it needs from the resource available at the particular input port and enters into block 48. In block 48 the SLT is forwarded and the program loops back to block 30 to repeat the described process.

With respect to the invention described herein a node cannot use another node's resource unless it performs an explicit resource reservation as described herein. A node should not use another node's resource beyond what it has reserved. When a node "consumes" its reservation it needs to make a new reservation if more resources are required. In subsequent receipt of the SLT (that is, after the first time) the RCU updates the AvResInP$_i$ value in the SLT for every InP$_i$ that it has according to the following scheme: Let ResInP$_i$ be the total amount of release resource associated with InP$_i$ since the last time the SLT was received. For every InP$_i$ the RCU adds ResInP$_i$ to AvResInP$_i$ in the SLT before forwarding the SLT.

For example, if Node$_1$ releases five units of resource as a result of processing the data received at InP$_{k-2}$ it adds five to ResInP$_{k-2}$ which will be added to AvResInP$_{k-2}$ the next time the RCU for Node$_{N-1}$ receives the SLT.

A node may cancel its reservation for resources it has reserved in other nodes. When a node's RCU receives a SLT it also uses that to cancel any reserved resources in other nodes that it may not need. For example, assume Node$_0$ (FIG. 1) has reserved ten units in InP$_{k-2}$ and wants to cancel four units. When the RCU for Node$_0$ receives the SLT it adds 4 to the value of AvResInP$_{k-2}$.

The invention provides a decentralized "Advertisement-based" scheme: Receivers advertise their resources and senders take what they need in a distributed fashion.

The invention supports dynamic resource reservation for
  One sender one receiver,
  One sender many receivers,
  Many receivers one sender, and
  Many senders many receivers with one reservation message. Receivers need not know who the senders are when resource reservations are made. The inventor can work inband or out-of-band.

Based upon the above description and drawings, it will be understood by those skilled in the art that the particular embodiments shown and described herein are for purposes of illustration only and are not intended to limit the scope of the invention. Those skilled in the art will recognize that the invention may be embodied in other specific forms without departing from its spirit or central characteristics. References to details of particular embodiments are not intended to limit the scope of the claims.

The invention claimed is:

1. A system comprising:
  a message having at least one subfield to carry identifying indicator for at least one port and associated space concatenated to the at least one subfield for carrying information associated with resources available at said at least one port;
  at least one buffer to receive said message; and
  a resource control unit monitoring the message, if said at least one sub-field carries an identifying indicia that matches an ID (identification number) of a port in a node manage by said resource control unit write in the associated space resources available at said at least one port for other nodes to use, if the identifying indicia matches a port ID for a port to which the node wishes to communicate adjusting resource information recorded in the space to reflect one of resources reserved and resources cancelled by said node; and
forwarding the message including the adjusted resource information.

2. The system of claim 1 wherein resources are being reserved by subtracting the amount of resources that the RCU needs from the resource information recorded in the space.

3. The system of claim 1 wherein reserved resources are being cancelled by adding an amount of resources that the RCU does not need to the resources information recorded in the space.

4. A system comprising:
  a plurality of nodes;
  a medium operatively interconnecting the plurality of nodes;
  a token generating unit operatively coupled to the medium, said token generating unit generating and transmitting to the nodes a slotted token message having a plurality of sub-fields concatenated to one another and each sub-fields having a first part containing a port identification (id) and a second part concatenated to the first part;
  a Resource Control Unit (RCU) operatively positioned in each of the nodes, said RCU in each of the nodes examining the slotted token and writing in the second part of at least one selected sub field a value representing resources available at a port controlled by said RCU and adjusting a value representative of resources recorded in the second part of at least another selected sub field.

5. The system of claim 4 wherein adjustment to reserve resources includes the RCU subtracting a number of resources from the value within the second part.

6. The system of claim 4 wherein the token generation unit includes a stand alone unit.

7. The system of claim 4 wherein the token generation unit is within the node.

8. The system of claim 4 wherein the token generation unit is a function within the Resource Control Unit.

9. The system of claim 4 wherein writing only occurs if the identification (id) in the first part of the at least one selected sub field matches and id of a port controlled by said RCU.

10. The system of claim 4 wherein adjustment only occurs if an identification (id) in the first part of the at least another sub field matches an id of a port with which the RCU desires to communicate.

11. The system of claim 4 further including setting predefined indicia in the second part.

12. The system of claim 11 wherein the predefined indicia includes 0.

13. The method of claim 12 wherein the value in each of the second part of each slot is adjusted by subtracting a predetermined amount to indicate resources reserved by said RCU.

14. The method of claim 12 wherein the value in each of the second part of each slot associated with a port to which the RCU desires to communicate is adjusted by adding a predetermined amount to indicate cancellation of reserved resources.

15. A method for distributing information within a communications network comprising:
generating, with a token generator, a slotted token which includes a plurality of slots concatenated to one another and each slot having a first part and a second part concatenated to the first part;
writing, with said token generator, in the first part of each slot an initial value for identifying a port and setting the second part of each slot to a predefined value;
transmitting the slotted token from the token generator;
receiving, in a Resource Control Unit (RCU) located in each node, the slotted token so transmitted;
examining the slotted token to determine slots that are associated with ports controlled by said RCU and slots associated with ports with which the RCU wishes to communicate,
for slots associated with ports controlled by the RCU writing in the second part of each slot a value representative of resources available at each port,
for slots associated with ports with which the RCU wishes to communicate adjusting a value in the second part in each of said slot; and
forwarding the slotted token so adjusted.

* * * * *